0-276 CROSS REFERENCE SEARCH ROOM

United States Patent Office 3,143,683

Patented Aug. 4, 1964

3,143,683

TELEVISION TUBE WITH IMPROVED OPTICAL FILTER

James E. Duncan and John J. Smith, Natrona Heights, Pa., assignors to Pittsburgh Plate Glass Company, Allegheny County, Pa., a corporation of Pennsylvania No Drawing. Filed Jan. 2, 1959, Ser. No. 784,450

4 Claims. (Cl. 313—110)

The present invention relates to a glass which is suitable for use as an implosion plate or window for a color television set, and it particularly relates to a glass which selectively absorbs light in the yellow portion of the spectrum to a relatively greater extent than at other portions of the luminous spectrum, and transmits light in the red, blue and green portions of the spectrum to a relatively greater extent than at other portions of the luminous spectrum.

An implosion plate is employed in combination with a television picture tube in television sets in order to protect the viewers from harm in the event that the picture tube implodes. The implosion plate may be separately mounted in the cabinet of the set in spaced relation to the face plate of the picture tube. It is usually tempered to provide it with extra strength when used in this type of construction. The implosion plate may be laminated to the face plate of the picture tube by means of a clear resin interlayer to provide a "safety glass" type of construction. The implosion plate need not be tempered in the "safety glass" type of construction.

It is important that the implosion plate transmit a pleasing picture to the television viewer as well as function as a protective shield. It is therefore an object of the present invention to provide a glass with transmission and absorption properties which render it particularly suitable for use as an implosion window in a color television set. For this purpose, the glass must (1) appear to be neutral or gray in color for esthetic reasons when the set is not in operation and must be gray in appearance for black and white telecasts, (2) prevent all but minimum color distortion of the picture by ambient light from daylight or tungsten sources and (3) accentuate the output of the red phosphor of the picture tube without distorting the color values of the three basic color phosphors.

A color television picture tube and its mode of operation are described in an article on pages 136 to 139, 201, 202, 204 and 206 in the November 1955 issue of Fortune magazine. The article states that deposited on the inside surface of the face plate of the tube are 350,000 regularly spaced groups of dot phosphors. Each group is made up of three dot phosphors; one of which emits a blue color, another a red color and the third a green color when struck by electrons. Three electron guns are positioned in the tube neck and sighted through a mask onto the groups of phosphors so that the electrons from one gun strike only the blue phosphors, the electrons from another gun strike only the green phosphors and the electrons from the third gun strike only the red phosphors as the electron beams are deflected back and forth across the face of the tube.

The blue, green and red phosphors emit different intensities of color when struck by an electron beam of a given voltage. The blue phosphor gives off the brightest color, the green phosphor gives off the next brightest and the red phosphor gives off a color which has the least brightness of the three. When a white color is desired, the three phosphors should simultaneously emit light at about the same intensity. To accomplish this, the voltage which is applied to the tube is apportioned in different amounts to the different electron guns. For example, the gun which is sighted on the red phosphor may receive about 51 percent of the ultor voltage, the gun which is sighted on the green phosphor may receive about 30 percent of the ultor voltage and the gun which is sighted on the blue phosphor may receive about 19 percent of the ultor voltages. The ultor in a cathode ray tube is the electrode to which is applied the highest D.C. voltage for accelerating the electrons in the beam.

This apportionment of voltage to the electron guns may not permit the red phosphor to emit light at a sufficiently high intensity or degree of brightness to equal that of the green and blue phosphors. In order to help equalize the intensity of the colors, it is an object of the present invention to provide a glass for use as a face plate or an implosion plate which, by its filtering action, favors the transmission of light in the red portion of the spectrum, i.e., 620 to 740 millimicrons, relative to the transmission of light in the blue and green portions of the spectrum.

Ambient light from the room, when reflected to the viewer, cuts down on the color definition and contrast. This is particularly so in the yellow band of the spectrum, i.e., at about 580 millimicrons, the portion of the spectrum near which the eye is most sensitive. While it is desirable for the implosion window to absorb the ambient light, a uniform absorption over the total luminous portion of the spectrum by the implosion window also acts to absorb the light from the phosphors and decrease the picture brightness. The dot phosphors emit light in the blue, green and red portions of the spectrum and there is very little light emitted by the phosphors in the portions of the spectrum between these colors. It is desirable therefore to remove the deleterious effect of ambient light without decreasing the brightness of the picture by providing an absorbing medium which absorbs selectively in the portion of the spectrum at about 580 millimicrons where there is little light emitted by the phosphors. It is an object of the invention to provide a glass permitting relatively high transmission of light in the red, blue and green portions of the spectrum and permitting relatively low transmission of light in the portion of the spectrum at about 580 millimicrons.

It is a further object of the present invention to provide a glass having the above properties which can be manufactured by conventional plate and window glass manufacturing procedures. Conventional procedures for producing plate and window glass are set forth in the Glass Manual published and copyrighted in 1946 by the Pittsburgh Plate Glass Company.

It is a further object of the invention to provide small amounts of additives or colorants to conventional lime-soda-silica glasses which are used in the manufacture of commercial window and plate glass to produce glasses having the transmission properties described above for an implosion plate for a color television set.

The objects of the invention have been accomplished by adding to a conventional lime-soda-silica glass small amounts of the following ingredients: 0.05 to 0.4 percent $Fe_2O_3$, 0.3 to 1.2 percent $Nd_2O_3$, 0.01 to 0.05 percent NiO, 0.002 to 0.006 percent CoO and 0.002 to 0.02 percent Se. The lime-soda-silica glass may contain 65 to 75 percent $SiO_2$, 12 to 19 percent $Na_2O$, 6 to 13 percent CaO, 1 to 4 percent MgO and 0.2 to 4 percent $Al_2O_3$. The following compositions are exemplary of glasses within the scope of the invention:

*Table I*

| Ingredient | Percent by weight | | | | |
|---|---|---|---|---|---|
| | 1 | 2 | 3 | 4 | 5 |
| $SiO_2$ | 68.8 | 68.5 | 71.4 | 72.3 | 71.2 |
| $Na_2O$ | 17.2 | 17.1 | 13.5 | 13.4 | 13.3 |
| $K_2O$ | 0.4 | 0.4 | ---- | ---- | ---- |
| CaO | 7.4 | 7.3 | 11.7 | 8.4 | 11.6 |
| MgO | 2.6 | 2.6 | 2.5 | 3.6 | 2.5 |
| $Al_2O_3$ | 3.0 | 3.0 | 0.2 | 1.2 | 0.2 |
| $Nd_2O_3$ | 0.4 | 0.85 | 0.42 | 1.05 | 0.9 |
| $Pr_6O_{11}$ | 0.06 | 0.11 | 0.05 | 0.13 | 0.1 |
| $Fe_2O_3$ | 0.17 | 0.16 | 0.12 | 0.16 | 0.2 |
| NiO | 0.015 | 0.034 | 0.015 | 0.037 | 0.035 |
| CoO | 0.003 | 0.004 | 0.003 | 0.004 | 0.004 |
| Se | 0.003 | 0.004 | 0.003 | 0.006 | 0.004 |
| Thickness (inches) | ¼ | ⅛ | ¼ | ⅛ | ⅛ |

In the glasses, $SiO_2$ is the principal glass former. The alkali metal oxides such as $Na_2O$ and $K_2O$, and the alkaline earth metal oxides, such as CaO and MgO, are employed as fluxes. A certain amount of $Al_2O_3$ may be present to aid in adjusting the viscosity of the glass as the amounts of $SiO_2$, alkali metal oxides and alkaline earth metal oxides are varied. The ratio of these ingredients to each other has been established to provide a glass which is readily melted, refined and formed into sheets and plates at high production rates with minimum cost. Conventional refining and melting aids such as small amounts of chlorides, sulfates, arsenic trioxide, etc. may also be employed. This combination of ingredients is well known in the art of glass making.

The addition of $Fe_2O_3$, CoO, NiO, Se and $Nd_2O_3$ to a lime-soda-silica glass in the stated amounts produces the desired transmission properties in the glass. A certain amount of praseodymium is present with most commercial forms of neodymium compounds. The combination of neodymium and praseodymium normally found in commercially available neodymium compounds is effective in producing the desired absorption at about 580 millimicrons. It is preferred that the praseodymium be absent, but it may be present in an amount up to about 25 percent by weight of the neodymium. The other coloring ingredients, i.e., $Fe_2O_3$, NiO, CoO and Se, in the stated proportions are necessary to control the transmittance of the glass in the wave length range of 420 to 560 millimicrons and at wave lengths above 600 millimicrons in the luminous portion of the spectrum. The combination of the colorants favors transmission in the red portion of the spectrum.

The luminous transmittance for the glasses of the invention is 55 to 65 percent when calculated according to the weighted ordinate method described in Hardy's Handbook of Colorimetry, Technology Press, Massachusetts Institute of Technology, copyrighted in 1936, using the tristimulus values for P22 illuminant. The tristimulus values for the P22 illuminant are calculated from the spectral energy emission values of tricolor phosphor P22 employed in the Radio Corporation of America's color picture tube 21CYP22. The color system of this picture tube is described in the above mentioned article in Fortune magazine.

To illustrate the transmittance properties of the glass of the present invention, there is provided below the radiant energy transmittance data for a sample of the glass listed under Composition No. 1 in the table above for a ¼ inch thickness.

*Table II*

| Wave length (millimicrons): | Radiant energy Transmittance (percent) |
|---|---|
| 400 | 68.2 |
| 420 | 58.5 |
| 440 | 51.3 |
| 460 | 51.5 |
| 480 | 53.3 |
| 500 | 55.6 |
| 520 | 54.3 |
| 540 | 58.4 |
| 560 | 62.8 |
| 580 | 45.2 |
| 600 | 54.9 |
| 620 | 62.3 |
| 640 | 62.5 |
| 660 | 65.4 |
| 680 | 71.8 |
| 700 | 77.3 |

The above data for transmittance of the glass in the visible portion of the spectrum shows that the glass favors transmission in the red portion of the spectrum as noted by the rise in transmittance values in the wave length region of 620 to 700 millimicrons and absorbs between the red and green as noted by the relatively low transmission of light at about 580 millimicrons. Further, there is a peak in the curve at 540 to 560 millimicrons which represents relatively greater transmission of the green portion of the spectrum. This selective transmission and absorption of the various portions of the spectrum enhances the contrast between the primary colors of blue, green and red. The ratio of the additives or colorants to each other is substantially the same as that listed in the examples. The ranges listed for the colorants are necessary to obtain glasses of various thicknesses having the desired transmittance properties. Lesser amounts of colorants are required for thicker glasses and greater amounts of colorants are necessary for thinner glasses to hold the effective absorption and overall transmittance values at equivalent levels.

The glasses of the invention may be produced from conventional glass making materials properly compounded and thoroughly mixed so as to yield, when reacted, glasses of the desired ultimate composition. Suitable batch materials include sand, soda ash, potassium carbonate, dolomite, limestone, sodium nitrate, sodium chloride, sodium sulfate, arsenious oxide, nepheline syenite, feldspar, aplite, iron oxide, neodymium carbonate (providing in the glass about 9 parts by weight of neodymium oxide to 1 part by weight of praseodymium oxide), nickel oxide, cobalt oxide and selenium metal. Didymium oxide (a mixture of approximately 80 percent by weight of neodymium oxide and 20 percent by weight of praseodymium oxide) can also be used in place of or in addition to neodymium carbonate. Pure neodymium oxide is a very desirable batch ingredient, but its cost is extremely high.

The times and temperatures for melting, refining, forming, annealing and tempering these glasses are the same as those employed by the conventional window glass and plate glass manufacturing processes and the conventional tempering procedures. These conditions are well known to those skilled in the art.

For purposes of specifically describing a method of making the glasses, the procedure for making the glasses set forth in columns 1 and 2 of Table I in refractory pots is described. The temperatures and melting conditions herein recited may be employed to make 80 pounds of glass in a refractory pot in a furnace heated by the controlled combustion of natural gas. An empty pot is preheated in the furnace at a furnace temperature of about 2250° F. A portion of the mixed batch is ladled into the pre-heated pot, and the furnace temperature is gradually increased until it reaches approximately 2550° F. in 2½ hours during which time the remaining batch is added to the pot. The pot and its contents are heated for an additional hour and a half and the furnace temperature is gradually increased to 2650° F. At the end of this time the glass is formed in a molten condition. The molten glass is then held at a furnace temperature of 2650° F. for 3 hours to permit the conclusion of the chemical reactions, the exclusion of gases and the substantial homogenization of the glass. It is desired that the glass be produced under neutral to slightly oxidizing conditions in the melting furnace or container.

The refined glass is cooled to approximately 2100° F. and the pot is removed from the furnace. The contents of the pot are poured on a cast iron table where the glass is rolled into the form of a plate. The plate is placed in a kiln and cooled from a temperature of about 1000° F. to about 880° F. at a rate of about 5° F. per minute. During this cooling operation the glass is annealed. After further cooling to room temperature, the glass is ground and polished by conventional plate glass grinding and polishing techniques.

The glass may be tempered to provide it with additional strength for its use as an implosion window. The tempering is accomplished in the conventional manner using equipment shown in U.S. Patents Nos. 1,960,222, 1,970,730 and 2,131,406.

Although the present invention has been described with respect to specific details of certain embodiments thereof, it is not intended that such details be limitations upon the scope of the invention except insofar as set forth in the accompanying claims.

We claim:

1. A color television tube having a face plate composed of a substantially neutral colored, transparent, lime-soda-silica glass favoring transmission in the red portion of the visible spectrum and absorption between the red and green portions of the visible spectrum including as essential ingredients in the following proportions by weight: 0.05 to 0.4 percent $Fe_2O_3$, 0.3 to 1.2 percent $Nd_2O_3$, 0.01 to 0.05 percent NiO, 0.002 to 0.006 percent CoO and 0.002 to 0.02 percent Se, and having a plurality of groups of blue, green and red color emitting phosphors supported on the inside surface of the face plate.

2. In combination with a color television tube employing blue, green and red color emitting phosphors, an implosion window made of a substantially neutral colored, transparent, lime-soda-silica glass favoring transmission in the red portion of the visible spectrum and absorption between the red and green portions of the visible spectrum including as essential ingredients in the following proportions by weight: 0.05 to 0.4 percent $Fe_2O_3$, 0.3 to 1.2 percent $Nd_2O_3$, 0.01 to 0.05 percent NiO, 0.002 to 0.006 percent CoO and 0.002 to 0.02 percent Se.

3. A face plate for a color television tube, said face plate being composed of a substantially neutral colored, transparent, lime-soda-silica glass favoring transmission in the red portion of the visible spectrum and absorption between the red and green portions of the visible spectrum including as essential ingredients in the following proportions by weight: 0.05 to 0.4 percent $Fe_2O_3$, 0.3 to 1.2 percent $Nd_2O_3$, 0.01 to 0.05 percent NiO, 0.002 to 0.006 percent CoO and 0.002 to 0.02 percent Se.

4. An implosion window for use with a color television tube employing blue, red and green color emitting phosphors, said implosion window being made of a substantially neutral colored, transparent, lime-soda-silica glass favoring transmission in the red portion of the visible spectrum and absorption between the red and green portions of the visible spectrum including as essential ingredients in the following proportions by weight: 0.05 to 0.4 percent $Fe_2O_3$, 0.3 to 1.2 percent $Nd_2O_3$, 0.01 to 0.05 percent NiO, 0.002 to 0.006 percent CoO and 0.002 to 0.02 percent Se.

References Cited in the file of this patent

UNITED STATES PATENTS

| | | |
|---|---|---|
| 2,031,722 | Loewe et al. | Feb. 25, 1936 |
| 2,047,020 | Flaherty | July 7, 1936 |
| 2,293,529 | Bedford | Aug. 18, 1942 |
| 2,524,719 | Tillyer | Oct. 3, 1950 |
| 2,806,163 | Benway | Sept. 10, 1957 |
| 2,938,808 | Duncan et al. | May 31, 1960 |
| 3,013,114 | Bridges | Dec. 12, 1961 |